April 14, 1964  H. OTT  3,129,037

GAS-LUBRICATED JOURNAL BEARING

Filed Dec. 26, 1961

INVENTOR

Hanns Ott

BY *Pierre Schiffler & Parker*

ATTORNEYS

United States Patent Office 3,129,037
Patented Apr. 14, 1964

3,129,037
GAS-LUBRICATED JOURNAL BEARING
Hanns Ott, Nussbaumen, Switzerland, assignor to Aktiengesellschaft Brown, Boveri & Cie., Baden, Switzerland, a joint-stock company
Filed Dec. 26, 1961, Ser. No. 162,178
Claims priority, application Switzerland Jan. 11, 1961
5 Claims. (Cl. 308—121)

The invention relates to a gas-lubricated journal bearing which is especially suited for operation in a dust-laden environment.

Radially supporting journal bearings, operating with gas, e.g. air, helium, or carbonic-acid, as a lubricating medium, require very small play in the bearing and exceedingly finely worked bearing surfaces. They are thus endangered if solid impurities are forced in with the lubricating gas between shell and shaft.

For the sake of quiet running, the bearing-bores of gas-lubricated journal bearings are often not produced with purely cylindrical sections, but are provided with very flat recesses in the bearing surfaces. By means of axial grooves in the bearing bushings and openings into the latter, the lubricating gas for the bearing surfaces is fed in from the environment. The grooves do not extend to the lateral ends of the bearing bushings so that at these ends, as well as in the extent of the grooves between shaft and bearing bushings, there remains open a gap, this being very narrow radially. The lubricating gas which is fed from the environment into the axial grooves is distributed axially over the width of the bearing. The gas quantity which flows per unit-time through the aforementioned openings into the bearing, is equal to the gas quantity flowing out of the bearing via the aforementioned gaps, situated on both sides of the bearing bushings.

If a bearing of the described construction should be in a dust-laden environment, then dust is continually fed into the bearing through the gas openings, and the operational safety of the bearing is endangered. This could be prevented by means of filters which are situated before the gas openings. This measure is, however, involved since the filter must be checked and cleaned periodically.

The purpose of the invention is to avoid this disadvantage. It relates to a gas-lubricated journal bearing of the self-acting type in that the gas is put into circulation by rotation of the shaft rather than by use of extraneous pump devices, which requires no filter and which guarantees continual operation without supervision in a dust-laden environment, it being of simple construction. It is characterised by circumferential grooves which are arranged at both lateral ends of the bearing bushing, and by connections through which the lubricating gas is conducted into the axial grooves of the bearing bushings.

Figure 1:
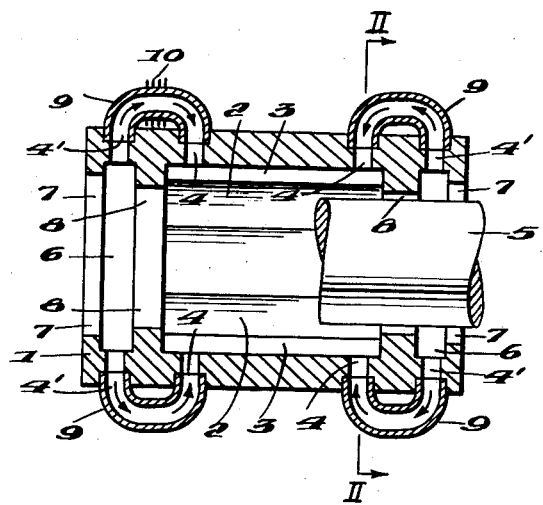
Figure 2:
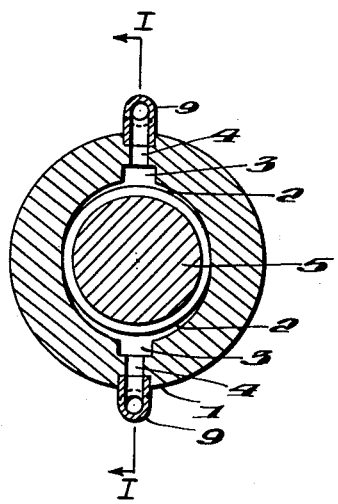

The drawing shows an exemplary design of the journal bearing, as according to the invention, in which In FIG. 1 is represented a longitudinal cross-section through the bearing taken from the line I—I of the FIGURE 2.

In FIG. 2 is shown a cross-section through the bearing taken from the line II—II of the FIGURE 1.

Figure 3:
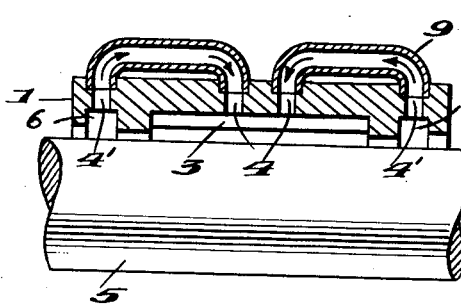
Figure 4:
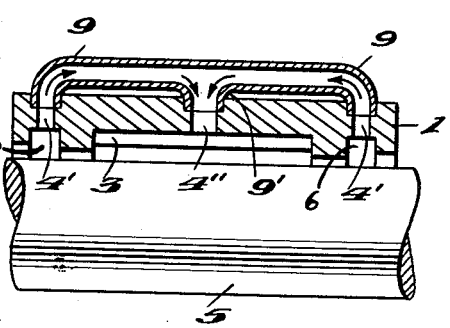

In the FIGURES 3 and 4 are illustrated various arrangements of the gas connections In all figures similar components are represented with similar symbols.

In FIGS. 1 and 2, 1 is the bearing bushing of a gas-lubricated journal bearing, whose bearing surfaces are provided with very flat recesses 2. These recesses as well as the bearing clearance and the circumferential gaps, described later on, are shown for the sake of clarity excessively large in the drawing. Actually the recesses and gaps in question are of the order of hundredths of millimetres in depth or, respectively, width. Axial grooves are denoted by 3, and openings in the bearing bushings by 4. These latter serve to introduce the lubricating gas into the bearing surfaces. The shaft is denoted by 5.

Outside the supporting part of the bearing bushing this is extended—compared with conventional gas-lubricated bearings—and on both sides of the extensions are arranged peripheral grooves 6. Each of these peripheral grooves, when the shaft 5 is in position, communicates with the environment via one of the peripheral gaps 7 and communicates with the recesses 2 through one of the peripheral gaps 8 established by the bearing clearance and which thus belongs to the supporting parts of the bearing. The inside diameter of the peripheral gaps 7 is equal to or greater than that of the peripheral gaps 8.

The peripheral grooves 6 are connected with the inlet openings 4, and the axial grooves 3, by means of outlet openings 4' and duct connections 9, whereby each axial groove 3 possesses at least one connection 9' to each of the two peripheral grooves 6. The inlet openings 4" can, according to FIG. 1, be situated near the lateral ends of the axial grooves 3 or they can, as according to FIG. 3, be located near the middle of the supporting part of the bearing bushing 1. It is, however, also possible according to FIG. 4, that the connections 9 are joined to a mutual connecting piece 9' and the lubricating gas thus led into the axial grooves 3 through a common opening 4". Further it could be that the gas connections, which are shown in all figures as being pipe-connections, are replaced by hollow spaces in the inner wall of the bearing bushings.

The described arrangement enables an internal circulation of the lubricating gas to take place and thus makes the gas-lubrication of the bearing, in practice, unaffected by the environment. The forced entry of impurities into the bearing is thus wellnigh completely obviated since no gas is sucked in or supplied from the outside.

The gas, which flows axially out of the lubricating recess of the supporting part of the bearing into the peripheral grooves 6, contains a part of the work expended in friction in the form of heat. Although the friction in a gas-bearing is proportionally small, it may be necessary to cool the gas which flows out of the peripheral grooves 6 into the axial grooves 3. This can be managed by providing the connections 9 with a cooling device in some way or other, possibly when these connections are tubes by providing them for example with cooling-fins, as indicated in FIG. 1, by 10, or by causing the gas to flow back again into the bearing through a cooler.

I claim:

1. A self-acting gas-lubricated journal bearing comprising a bushing member having on opposite sides of the shaft supporting part thereof flat recesses 2 and axial grooves 3 in said recesses for distributing the gas over the recesses and whose cavities are filled with gas for lubrication, the improvement wherein annular grooves 6 are disposed respectively in end parts of the bushing member located axially to each side of the shaft supporting part thereof, said annular grooves being in communication respectively with said flat recesses by means of annular gaps 8 constituting the clearance between the shaft supporting part of the bushing and the shaft 5 and said annular grooves also being in communication with said axial grooves in said flat recesses by means of duct connections 9 whereby the lubricating gas flowing from said flat recesses through said annular gaps into said annular grooves is returned to said axial grooves and hence, to said flat recesses.

2. A gas-lubricated journal bearing as defined in claim 6 wherein said duct connections are so located as to lead the lubricating gas back from said annular grooves to the axial grooves at the lateral ends of the shaft supporting part of said bushing member.

3. A gas-lubricated journal bearing as defined in claim 1 wherein said duct connections are so located as to lead the lubricating gas back from said annular grooves to the axial grooves at substantially the middle portion of the shaft supporting part of said bushing member.

4. A gas-lubricated journal bearing as defined in claim 1 wherein said duct connections lead from each of said annular grooves back to a common gas lead-in connection to said axial grooves located at substantially the middle portion of the load supporting part of said bushing member.

5. A gas-lubricated journal bearing as defined in claim 1 and which further includes a cooling device in heat transfer relationship with said duct connections for cooling the lubricating gas.

References Cited in the file of this patent

UNITED STATES PATENTS 2,578,711     Martellotti  ----------- Dec. 18, 1951